United States Patent [19]

Kreuz et al.

[11] 4,033,191
[45] July 5, 1977

[54] INDICATING INSTRUMENT AND CASING

[75] Inventors: Alois Kreuz, Dornigheim; Joachim Hahn, Obenursel, both of Germany

[73] Assignee: VDO Adolf Schindling AG, Frankfurt am Main, Germany

[22] Filed: Sept. 11, 1975

[21] Appl. No.: 612,543

[30] Foreign Application Priority Data

Sept. 13, 1974 Germany .......................... 2443867

[52] U.S. Cl. ............................................. 73/431
[51] Int. Cl.[2] .................. G01D 11/24; G01D 11/26
[58] Field of Search ..................... 73/431; 220/288; 215/331

[56] References Cited
UNITED STATES PATENTS

| 2,952,374 | 9/1960 | Pryale | 215/331 |
| 3,152,480 | 10/1964 | Hoff | 73/431 |
| 3,869,916 | 3/1975 | Ojima | 73/431 |

FOREIGN PATENTS OR APPLICATIONS

| 1,171,246 | 11/1969 | United Kingdom | 220/288 |

Primary Examiner—S. Clement Swisher
Assistant Examiner—Denis E. Corr
Attorney, Agent, or Firm—Otto John Munz

[57] ABSTRACT

An indicating instrument, particularly adapted for use with watercraft, with a cup-shaped casing of plastic material. The casing holds a measuring instrument with a dial. The front end of the casing is shut by a window shield and enveloped by a front frame.

10 Claims, 2 Drawing Figures

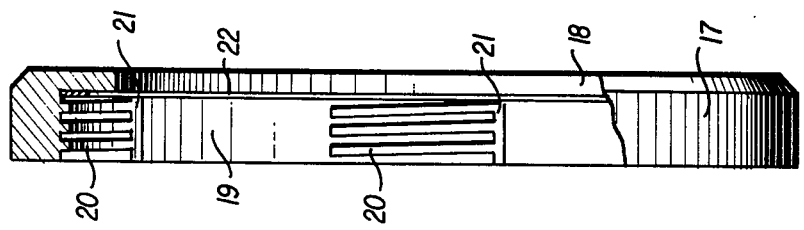
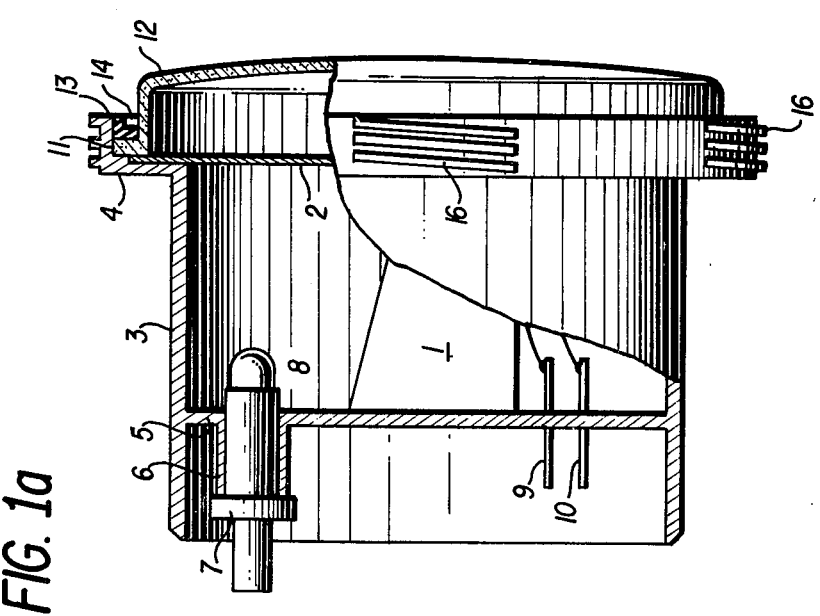

INDICATING INSTRUMENT AND CASING

BACKGROUND OF THE INVENTION

1. FIELD OF THE INVENTION

The invention relates to an indicating instrument and a casing therefor.

2. DESCRIPTION OF THE PRIOR ART

Indicating instruments are already known in which the casing of plastic material forms a one-piece unit with the front frame. Such indicating instruments have the disadvantage that wishes of the buyer regarding the style or design of the front frame as to shape and/or dimension can only be realized, if at all, by a costly alteration of the extrusion die.

Furthermore, it has been proposed to construct the front ring of the indicating instrument so as to be capable of being slipped or screwed onto the casing. Such a structure permits the attachment of a great variety of front rings to the casing without having to make alterations to the extrusion die for the casing. This solution, however, is not transferable to front frames, which frequently are of a non-circular shape, since front frames, due to their size and their weight, usually cannot be slipped on but must be capable of being screwed on.

Therefore, substantial difficulties arise in the correct positioning of the frame with regard to fixing on the casing.

SUMMARY OF THE INVENTION

The invention provides an indicating instrument that can be equipped with front frame of a great variety of sizes and/or shapes and in which the front frames can be mounted and dismounted, as well as be aligned with the casing and dial with a minimum of manipulation. In addition, the instrument is of a simple structure, is easy to manufacture and has a minimum of structural elements.

This problem is solved on the basis of the initially described indicating instrument, according to the invention, by means of a wedge-shaped screw joint between the front frame and the casing. The screw joint comprises at least one end stop provided on the casing and/or on the front frame and contains an elastic-rubber element arranged between the front surface of the casing and the front frame.

By means of such a construction of front frame and casing, the individual front frames can not only be readily mounted and dismounted, but, due to the end stop or stops, can also be aligned with the casing and dial without the slightest difficulties. The fact that the elements of the wedge-shaped screw joint can be molded to the plastic front frame and casing in the manufacture thereof results in considerable manufacturing advantages.

In a preferred embodiment, the front frame is provided on its back with a circular central recess which is larger than the observation aperture and has, on at least two places distributed over its periphery, at least one rib with an edge inclined with respect to the front surface. The casing supports have, at corresponding places, at least one rib with an edge inclined with respect to the front surface. In this structure, at least one of the ribs is provided at the casing and/or at the front frame, with an end stop. The particular advantage of this embodiment is that the wedge-shaped screw joint is no longer visible after the indicating instrument has been mounted in an instrument panel or the like.

Furthermore, it has proved advantageous to provide the front end of the casing with an extension of a larger diameter whose inside is provided with a thread for screwing in a holding ring that locks the window shield and whose outside is shaped in such a manner as to hold the front frame. In this structure, the casing and the window shield constitute a structural unit closed in itself, for the completion of which as an indicating instrument, only a front frame is required. Such a structure has a particularly advantageous effect upon the storing as well as the transportation of the indicating instrument.

In another possible embodiment, the front frame and the means locking the window shield form a one-piece unit. This embodiment has a minimum of structural elements, but has disadvantages with respect to storing and transportation since three loose structural elements, that is the casing, window shield, and front frame, exist until the selected front frame is slipped on the casing. Such and embodiment is particularly applicable when only a small number of different front frames are available for selection for the indicating instrument.

The casing consists most suitably of a light-transmissive, transparent plastic material, for a particularly favorable ratio between inspection diameter and casing diameter. In such a casing, the light emitted by a light source positioned behind the dial for the illumination of the dial is directed forward in the light-transmissive casing wall and therefrom at the front wall of the casing by reflection from the casing wall against the dial. Thus, the light passage gap usually provided in indicating instruments between dial and inside wall of the casing is no longer needed. The edge of the dial can therefore be extended directly to the inside wall of the casing, and the usual provision of a diaphragm between window shield and dial can be dispensed with.

In a casing of a light-transmissive plastic material, in order to prevent a reflection by way of the front frame which might result in a deterioration of the reading indication of the dial, particularly in very dark environment, it is advisable to make the front frame at least partially of an opaque material. For many cases, a front frame of a plastic material dyed black has proved quite advantageous with respect to its manufacturing expenses. The front frame may, however, also consist of a transparent or non-transparent plastic material and the surface of the front frame that faces the observer may be provided with a metal layer, preferably a chromium layer. The latter will be preferred when a particular esthetic effect is to be achieved with the front frame.

BRIEF DESCRIPTION OF THE DRAWINGS

The invention will be explained in greater detail with the aid of the drawings, which show an embodiment in a partly diagrammatical representation.

FIG. 1a is a partially cutaway side view of an indicating instrument;

FIG. 1b is a partially cutaway side view of a front frame for use on the instrument of FIG. 1a.

DESCRIPTION OF THE PREFERRED EMBODIMENTS

The indicating instrument shown in a side elevation presenting a partial section, contains a measuring element 1 not shown in detail, for example, a moving coil measuring system, to which a dial 2 is fastened. Measuring element 1 is positioned in a cup-shaped casing 3 of a light-transmissive, transparent plastic material, the front end of which is converted into an extension 4 of a larger diameter and at whose base 5 the measuring element 1 is fastened. At base 5 there are also provided a mounting support 6 for a lamp socket 7, wherein an incandescent bulb 8 is fastened, and two electric terminals 9 and 10 for measuring element 1.

The inside of extension 4 is provided with a thread 11 into which a holding ring 13 is screwed. The holding ring locks the cup-shaped window shield 12 to casing 3. Holding ring 13 is provided with at least two recesses 14 facing each other into which a screwing tool can be inserted. On the outside of extension 4, three ribs 16 are molded in each case to the extension at four places staggered by 90° of angle, which ribs are slightly inclined with respect to the front surface of the casing. These ribs constitute one portion of the wedge-shaped screw joint.

A front frame 17, detached from casing 3, which may be of square shape and of black-dyed plastic material, is provided on its back with a circular central recess 19 which is larger than the observation aperture 18. The diameter of this recess is adapted to the outer diameter of extension 4. Three ribs 20 in each case are provided on the peripheral area of recess 19 at four places staggered by 90° of angle. These three ribs are in each case converted at one end to an end stop 21 and are slightly inclined with respect to the front surface of the frame. Ribs 20 form the other portion of the wedge-shaped screw joint. The position and the distance of ribs 16 and 20 are chosen in such a way that, after front frame 17 has been slipped onto extension 4 and front frame 17 has been turned with respect to extension 4, the individual ribs 16 and 20 engage each other and, in the terminal phase of the turning, ribs 16 abut against end stop 21. An unintentional loosening of this turning joint is prevented by a rubber ring 22 which is inserted in front frame 17 and is compressed when front frame 17 is being screwed upon extension 4.

What is claimed is:

1. In an indicating instrument comprising a cup-shaped casing of plastics material, a measuring element within the casing, the measuring element including a display dial, the front end of the casing forming an extension of enlarged diameter interiorly threaded and being obturated by a window to form an observation aperture shield and being enveloped by a front frame provided on its back with a circular central recess which is larger than said observation aperture, the improvement comprising:
    A. at least two circumferentially-spaced ribs in said recess each having an edge inclined with respect to the front surface of said frame,
    B. at least two circumferentially-spaced ribs on and exteriorly of said extension, each having an edge inclined with respect to the front surface of said frame,
    C. all said ribs conjointly forming matting wedge-shaped screw joints cooperating to releasably secure the front frame on the casing,
    D. at least one end stop for the screw joints,
    E. a threaded holding ring engaging the threads of said extension and contacting the peripherally-flanged rim of said window to hold the same to the casing, and
    F. an elastic element arranged between the front surface of said extension and the front frame.

2. The indicating instrument of claim 1, the front frame being composed of black-dyed plastics material.

3. The indicating instrument of claim 2, and a metal layer over and secured to the surface of said front frame that faces the observer.

4. In an indicating instrument, a cup-shaped casing adapted to house a measuring element and having side walls symmetrical about a central axis and a rim flanged radially outwardly then forwardly to define a first circular recess, first thread means fixed with the forwardly-directed portion of said rim, exteriorly thereof and coaxial about said axis, a window shield of transparent material and having a periphery fitting said first recess, ring means secured in and extending about said first recess and engaging and holding the periphery of said window shield to hold the same to said casing, a front frame comprising a circumferential portion with integral forwardly-facing radially-inward flange defining a circular observation aperture to expose said window shield, second thread means fixed with said front frame interiorly of said circumferential portion and detachably engaging said first thread means to hold the inner surface of said radially inward flange contiguous to and in axial registration with and over said ring means.

5. The instrument of claim 4, said first and second thread means being interrupted and including interengaging stops to limit engaged rotation of said front frame on and with respect to said casing.

6. The instrument of claim 4, said window shield being cup-shaped to extend axially outwardly through said observation aperture in fitting relation therewith, and having a radially outwardly flanged periphery engaged by said ring means.

7. The instrument of claim 6, said ring means exteriorly threaded and engaging threads forming interiorly in the casing walls defining said first recess.

8. The instrument of claim 4, and a dial having a rim clamped to said casing by and between the radially-outwardly flanged rim of said casing and the periphery of said window shield.

9. The instrument of claim 8, said casing being of light-transmitting plastics material.

10. The instrument of claim 4, said front frame being of essentially opaque plastics material and of preselected peripheral contour.

* * * * *